US008159689B2

(12) United States Patent
Hirota

(10) Patent No.: US 8,159,689 B2

(45) Date of Patent: Apr. 17, 2012

(54) IMAGE FORMING APPARATUS, IMAGE FORMING METHOD, IMAGE PROCESSING PROGRAM, AND STORAGE MEDIUM STORING IMAGE PROCESSING PROGRAM

(75) Inventor: Takashi Hirota, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1043 days.

(21) Appl. No.: 12/078,996

(22) Filed: Apr. 9, 2008

(65) Prior Publication Data

US 2008/0248197 A1 Oct. 9, 2008

(30) Foreign Application Priority Data

Apr. 9, 2007 (JP) ................................ 2007-102119

(51) Int. Cl.
*G06F 3/12* (2006.01)
*G06K 15/00* (2006.01)

(52) U.S. Cl. ........ 358/1.13; 358/1.15; 358/1.9; 358/3.1; 358/1.18

(58) Field of Classification Search ................. 358/1.13, 358/1.15, 1.9, 1.1, 1.2, 3.1, 3.01, 3.02, 3.11, 358/3.12, 3.22, 3.23, 1.11, 1.18, 501, 518, 358/537, 538, 401, 453, 452, 462, 464, 465, 358/466, 468; 347/2, 3, 5, 14, 23; 382/162, 382/165, 167, 170, 172; 399/1, 9, 16, 28, 399/38, 39, 76, 361, 362, 363, 364, 374
See application file for complete search history.

(56) References Cited

U.S. PATENT DOCUMENTS

2005/0179946 A1 8/2005 Takamatsu et al.
2006/0256404 A1* 11/2006 Yamada ........................ 358/504
2009/0279108 A1* 11/2009 Hoshi et al. .................... 358/1.2

FOREIGN PATENT DOCUMENTS

JP 06303408 A * 10/1994
JP 08248829 A * 9/1996
JP 2004-357074 12/2004
JP 2005-094666 4/2005
JP 2006-011229 1/2006
JP 2007-030201 2/2007

* cited by examiner

*Primary Examiner* — Dov Popovici

(74) *Attorney, Agent, or Firm* — Edwards Wildman Palmer LLP; David G. Conlin; Edmund Koundakjian

(57) ABSTRACT

An image forming apparatus that can reduce a difference in fog or image density between two facing pages of a booklet formed after duplex printing is provided. A CCD line sensor inputs a series of pieces of image data whose order of printing has been determined in advance. The CCD line sensor, a first storage section, a second storage section, and a calculation section determine a difference in printing density between the first face and the second face of the printing medium after duplex printing. A judgment section judges whether or not to change the order of printing based on the difference in printing density. A control unit controls the order of printing of the image data based on the judgment. An image forming section, a paper supply section, an image reading section, and an operation section print the image data on the printing medium.

13 Claims, 11 Drawing Sheets

F/G. 3

| | FIRST SHEET | | SECOND SHEET | | THIRD SHEET | | FOURTH SHEET | |
|---|---|---|---|---|---|---|---|---|
| | FIRST FACE | SECOND FACE | FIRST FACE | SECOND FACE | FIRST FACE | SECOND FACE | FIRST FACE | SECOND FACE |
| ORDER OF PRINTING | 1 | 2 | 3 | 4 | 5 | 6 | 7 | 8 |
| BACKGROUND DENSITY | LIGHT | DARK | LIGHT | DARK | LIGHT | DARK | LIGHT | DARK |
| PRINTING MEDIA MODEL AFTER DUPLEX PRINTING | A | B | D | C | E | F | H | G |
| PAGE NUMBER | 1 | 2 | 3 | 4 | 5 | 6 | 7 | 8 |
| BACKGROUND DENSITY | LIGHT | DARK | DARK | LIGHT | LIGHT | DARK | DARK | LIGHT |
| BOOKLET FORM MODEL | A | B | C | D | E | F | G | H |

TWO FACING PAGES (B, C) — TWO FACING PAGES (D, E) — TWO FACING PAGES (F, G)

FIG. 8 PRIOR ART

| | FIRST SHEET | | SECOND SHEET | | THIRD SHEET | | FOURTH SHEET | |
|---|---|---|---|---|---|---|---|---|
| | FIRST FACE | SECOND FACE | FIRST FACE | SECOND FACE | FIRST FACE | SECOND FACE | FIRST FACE | SECOND FACE |
| ORDER OF PRINTING | 1 | 2 | 3 | 4 | 5 | 6 | 7 | 8 |
| BACKGROUND DENSITY | LIGHT | DARK | LIGHT | DARK | LIGHT | DARK | LIGHT | DARK |
| PRINTING MEDIA MODEL AFTER DUPLEX PRINTING | A | B | C | D | E | F | G | H |
| PAGE NUMBER | 1 | 2 | 3 | 4 | 5 | 6 | 7 | 8 |
| BACKGROUND DENSITY | LIGHT | DARK | LIGHT | DARK | LIGHT | DARK | LIGHT | DARK |
| BOOKLET FORM MODEL | A | B | C | D | E | F | G | H |
| | | TWO FACING PAGES | | TWO FACING PAGES | | TWO FACING PAGES | | |

IMAGE FORMING APPARATUS, IMAGE FORMING METHOD, IMAGE PROCESSING PROGRAM, AND STORAGE MEDIUM STORING IMAGE PROCESSING PROGRAM

CROSS-REFERENCE TO RELATED APPLICATION

This application claims priority to Japanese Patent Application No. 2007-102119, which was filed on Apr. 9, 2007, the contents of which are incorporated herein by reference in its entirety.

BACKGROUND OF THE INVENTION

1. Field of the Invention

The present invention relates to an image forming apparatus, an image forming method, and an image processing program, in which an order of printing is controlled based on a difference in transfer efficiency between a first face and a second face of a printing medium after duplex printing, and a storage medium storing the image processing program.

2. Description of the Related Art

Some recent image forming apparatuses such as copiers and printers are known to perform duplex printing in which images are formed on both of a first face (hereinafter, is also referred to as a "front face") of a printing medium and a second face (hereinafter, is also referred to as a "back face"), which is an opposite face of the first face. Duplex printing is performed in such a manner that after an image is transferred and fixed to a first face of a printing medium, a printing medium reversing section or the like reverses the faces of the printing medium to supply the printing medium again to a transfer section on a transport belt, and then an image is transferred and fixed to a second face. After the duplex printing, for example, the printed materials can be stapled on the left side to be formed into a booklet.

When the duplex printing as described above is performed, a difference in fog or image density occurs between the first face and the second face in the printing medium after the duplex printing. Thus, the following problem is caused. FIG. 8 is a view showing the relationship between the order of printing in a conventional image forming apparatus and the page number of a formed booklet. FIG. 9 is a schematic view showing a state in which the booklet formed after the duplex printing performed by the conventional image forming apparatus is open. For example, as shown in FIG. 8, eight document images having an equal background density arranged in the order A, B, C, D, E, F, G, and then H are read by an image reading section of the image forming apparatus in the order A, B, C, D, E, F, G, and then H, and a series of pieces of image data is generated. Then the image data is printed by duplex printing on first faces and second faces of four sheets of printing medium in the order of printing that is the same as the order of reading of the document images, and then the obtained printing materials are stapled on the left side to be formed into a booklet. In the thus formed booklet, as shown in FIG. 9, the second page and the third page, the fourth page and the fifth page, and the sixth page and the seventh page, that is, two facing right and left pages are obtained as the combination of a first face R and a second face W of the printing medium. Thus, an outstanding difference in fog or image density may occur between the left and right pages. Such a difference in fog or image density appears particularly significantly with document images in which the color tone of the background is halftone.

In order to solve such a problem, for example, in an image forming apparatus in Japanese Unexamined Patent Publication JP-A 2004-357074, different density samples printed on a front face and a back face of a document are read by line sensors provided respectively on the front face and the back face, and parameters in image processing are corrected such that the densities on both faces are equal to each other, based on the difference in density between printed materials of the data read with the line sensors.

As described below, there are two causes of the difference in fog or image density between a first face and a second face of a printing medium after duplex printing. A first cause is that an image on a front face and an image on a back face of a document are read by different line sensors, and thus a difference in reading density between individual line sensors appears as the difference in fog or image density.

Furthermore, a second cause is that a resistance value of a printing medium in image formation on the second face is higher than that on the first face. This is caused by the phenomenon that when a toner image is fixed to the first face by thermal fixing, water in the printing medium evaporates due to heat applied in the fixing, and the amount of water in the printing medium decreases. With such different resistance values of the printing medium, the transfer efficiency in image formation on the first face is different from that on the second face, and thus the difference in fog or image density appears.

According to the image forming apparatus in JP-A 2004-357074, it is possible to reduce the difference in fog or image density derived from the first cause, that is, the configuration in which an image on the front face and an image on the back face of a document are read by different line sensors. However, this image forming apparatus is for correcting parameters in, for example, development conditions or surface potential conditions, and thus it is not possible to reduce the difference in fog or image density derived from the second cause, that is, the difference in transfer efficiency between image formation on the first face and image formation on the second face.

SUMMARY OF THE INVENTION

The invention has been made in view of the above-described problem, and it is an object of the invention to provide an image forming apparatus, an image forming method and an image processing program, which are capable of reducing a difference in fog or image density between two facing pages of a booklet formed after duplex printing, even in a case where a difference in fog or image density occurs between a first face and a second face of a printing medium after duplex printing, and a storage medium storing the image processing program.

The invention provides an image forming apparatus that performs duplex-printing in which image data is printed on both of a first face of a printing medium and a second face which is an opposite face of the first face, comprising:

an input section that can input a series of pieces of image data whose order of printing has been determined in advance;

a determination section that determines a difference in transfer efficiency between a first face and a second face of a printing medium after duplex printing;

a judgment section that judges whether or not to change the order of printing based on the difference in transfer efficiency determined by the determination section;

a control unit that controls the order of printing of image data based on the judgment; and an output section that prints image data on a printing medium, wherein in a case where the judgment section judges to change the order of printing, the output section prints image data on a printing medium in an order of printing that has been changed under control of the control unit.

In the invention, it is preferable that, in the case where the judgement section judges to change the order of printing, the order of printing of the image data on each even-numbered printing medium is changed into the reverse order of the predetermined order of printing.

In the invention, it is preferable that, in the case where the judgement section judges to change the order of printing, the order of printing of the image data on each odd-numbered printing medium is changed into the reverse order of the predetermined order of printing.

According to the invention, in an image forming apparatus that performs duplex printing in which image data is printed on both of a first face of a printing medium and a second face which is an opposite face of the first face, an input section inputs a series of pieces of image data whose order of printing has been determined in advance, a determination section determines a difference in transfer efficiency between a first face and a second face of a printing medium after duplex printing, a judgment section judges whether or not to change the order of printing based on the difference in transfer efficiency determined by the determination section, a control unit controls the order of printing of image data based on the judgment, and an output section prints image data on a printing medium. In a case where the judgment section judges to change the order of printing, the order of printing of the image data on each even-numbered or odd numbered printing medium is changed into the reverse order of the predetermined order of printing, and the output section prints image data on a printing medium in an order of printing that has been changed under control of the control unit.

Thus, a difference in fog or image density between two facing pages of a booklet formed after the duplex printing can reduced without correction of parameters in, for example, development conditions or surface potential conditions. Thus, a sense of visual incongruity when the booklet is open can be made smaller.

Furthermore, in the invention, it is preferable that in a case where the difference in transfer efficiency determined by the determination section is larger than a predetermined threshold value, the judgment section judges to change the order of printing.

According to the invention, in a case where the difference in transfer efficiency determined by the determination section is larger than a predetermined threshold value, the judgment section judges to change the order of printing.

Thus, even in a case where a difference in transfer efficiency is large between the first face and the second face of the printing medium after duplex printing, a difference in fog or image density between two facing pages of a booklet formed after the duplex printing can be reduced, and thus a sense of visual incongruity can be made smaller.

Furthermore, in the invention, it is preferable that the determination section includes:

a reading section that reads information for obtaining a background density of image data;

a first storage section that stores the information read by the reading section;

a second storage section that stores, in advance, a relationship between the background density of image data and the difference in transfer efficiency; and a calculation section that calculates the difference in transfer efficiency corresponding to the background density of image data obtained from the information stored in the first storage section, based on the relationship between the background density of image data and the difference in transfer efficiency stored in the second storage section.

According to the invention, the determination section includes: a reading section that reads information for obtaining a background density of image data; a first storage section that stores the information read by the reading section; a second storage section that stores, in advance, a relationship between the background density of image data and the difference in transfer efficiency; and a calculation section that calculates the difference in transfer efficiency corresponding to the background density of image data obtained from the information stored in the first storage section, based on the relationship between the background density of image data and the difference in transfer efficiency stored in the second storage section.

Thus, from information of image data, it is possible to easily calculate the accurate difference in transfer efficiency between the first face and the second face of the printing medium after duplex printing corresponding to the information. Thus, a difference in fog or image density between two facing pages of a booklet formed after the duplex printing can be reduced, and thus a sense of visual incongruity can be more made smaller.

Furthermore, in the invention, it is preferable that the second storage section stores a plurality of relationships between the background density of image data and the difference in transfer efficiency, according to the types of printing media.

According to the invention, the second storage section stores a plurality of relationships between the background density of image data and the difference in transfer efficiency, according to the types of printing media.

Thus, the calculation section can calculate the difference in transfer efficiency corresponding to the information stored in the first storage section, based on the relationship between the background density of image data and the difference in transfer efficiency according to the type of the printing medium. Thus, even in a case where the type of the printing medium is changed, a difference in fog or image density between two facing pages of a booklet formed after the duplex printing can be reduced, and thus a sense of visual incongruity can be made smaller.

Furthermore, in the invention, it is preferable that the threshold value is set to at least a minimum value at which the difference in printing density is recognized as a sense of visual incongruity.

According to the invention, the threshold value is set to at least a minimum value at which the difference in printing density is recognized as a sense of visual incongruity. Thus, a sense of visual incongruity derived from a difference in fog or image density between two facing pages of a booklet formed after the duplex printing can be made smaller.

Furthermore, in the invention, it is preferable that the output section includes a printing medium reversing section that reverses a first face and a second face of a printing medium after duplex printing.

According to the invention, the output section includes a printing medium reversing section that reverses a first face and a second face of a printing medium after duplex printing. Thus, printing medium after the duplex printing can be arranged in the same order as in the case where the media are printed in a predetermined order of printing, without requiring effort to manually reverse the first face and the second face of the printing media before forming a booklet, for example, in a case where the order of printing of image data is different from the predetermined order of printing. Thus, the time necessary for forming a booklet can be shortened.

Moreover, the invention provides an image forming method that performs duplex printing in which image data is printed on both of a first face of a printing medium and a second face which is an opposite face of the first face, comprising:

inputting a series of pieces of image data whose order of printing has been determined in advance;

determining a difference in transfer efficiency between a first face and a second face of a printing medium after duplex printing;

judging whether or not to change the order of printing based on the determined difference in transfer efficiency;

controlling an order of printing of image data based on the judgment; and printing image data on a printing medium.

In the invention, it is preferable that, in the case where the order of printing is judged to be changed, the order of printing of the image data on each even-numbered printing medium is changed into the reverse order of the predetermined order of printing.

In the invention, it is preferable that, in the case where the order of printing is judged to be changed, the order of printing of the image data on each odd-numbered printing medium is changed into the reverse order of the predetermined order of printing.

According to the invention, an image forming method that performs duplex printing in which image data is printed on both of a first face of a printing medium and a second face which is an opposite face of the first face, comprises: inputting a series of pieces of image data whose order of printing has been determined in advance; determining a difference in transfer efficiency between a first face and a second face of a printing medium after duplex printing; judging whether or not to change the order of printing based on the determined difference in transfer efficiency; controlling the order of printing of image data based on the judgment; and printing image data on a printing medium. In the invention, in the case where the order of printing is judged to be changed, the order of printing of the image data on each even-numbered or odd-numbered printing medium is changed into the reverse order of the predetermined order of printing. Thus, a difference in fog or image density between two facing pages of a booklet formed after the duplex printing can be reduced without correction of parameters in, for example, development conditions or surface potential conditions. Thus, a sense of visual incongruity when the booklet is open can be made smaller.

Furthermore, in the invention, it is preferable that the image data has a background density of a halftone region.

According to the invention, the image forming method is used in a case where the image data has a background density of a halftone region. Thus, even in a case where duplex printing is performed using image data that has a background density of a halftone region, in which the difference in fog or image density between the first face and the second face of the printing medium after duplex printing is large and thus a sense of visual incongruity is likely to appear particularly significantly, a difference in fog or image density between two facing pages of a booklet formed after the duplex printing can be reduced, and thus a sense of visual incongruity can be made smaller.

Moreover, the invention provides an image processing program that causes a computer to execute the image forming method.

Moreover, the invention provides a computer-readable storage medium that stores an image processing program for causing a computer to execute the image forming method.

According to the invention, it is possible to provide an image processing program for causing a computer to execute the image forming method, and a computer-readable storage medium that stores the image processing program.

BRIEF DESCRIPTION OF THE DRAWINGS

Other and further objects, features, and advantages of the invention will be more explicit from the following detailed description taken with reference to the drawings wherein:

FIG. 3 is a view showing a relationship between order of printing in the image forming apparatus of the invention and page number of a formed booklet;

FIG. 8 is a view showing relationship between order of printing in a conventional image forming apparatus and page number of a formed booklet.

DETAILED DESCRIPTION

Figure 1:
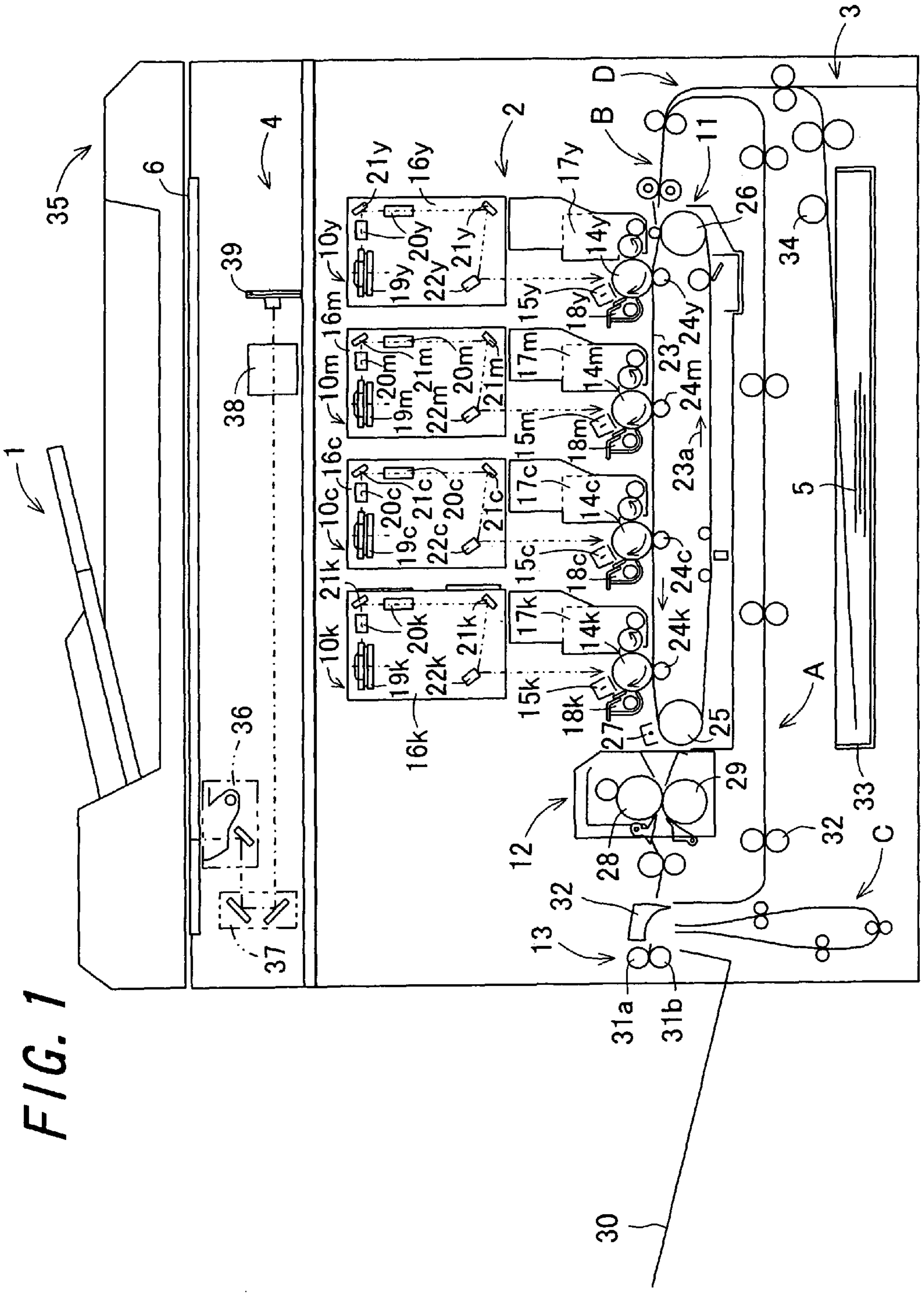
FIG. 1 is a cross-sectional view showing a configuration of an image forming apparatus according to one embodiment of the invention.

Now referring to the drawings, preferred embodiments of the invention are described below.

An image forming apparatus of the invention that performs duplex printing in which image data is printed on both of a first face of a printing medium and a second face which is an opposite face of the first face, comprises: an input section that can input a series of pieces of image data whose order of printing has been determined in advance; a determination section that determines a difference in transfer efficiency between a first face and a second face of a printing medium after duplex printing; a judgment section that judges whether or not to change the order of printing based on the difference in transfer efficiency determined by the determination section; a control unit that controls the order of printing of image data based on the judgment; and an output section that prints image data on a printing medium.

In a case where the judgment section judges to change the order of printing, the output section prints image data on printing media in an order of printing that has been changed under control of the control unit.

Accordingly, a difference in fog or image density between two facing pages of a booklet formed after the duplex printing can be reduced without correction of parameters in, for example, development conditions or surface potential conditions. Thus, a sense of visual incongruity when the booklet is open can be made smaller.

It should be noted that the difference in transfer efficiency between the first face and the second face of the printing medium after duplex printing appears as the difference in printing density between the first face and the second face of the printing medium after duplex printing, and thus in the embodiments of the invention described below, the difference in printing density corresponds to the difference in transfer efficiency.

Figure 2:
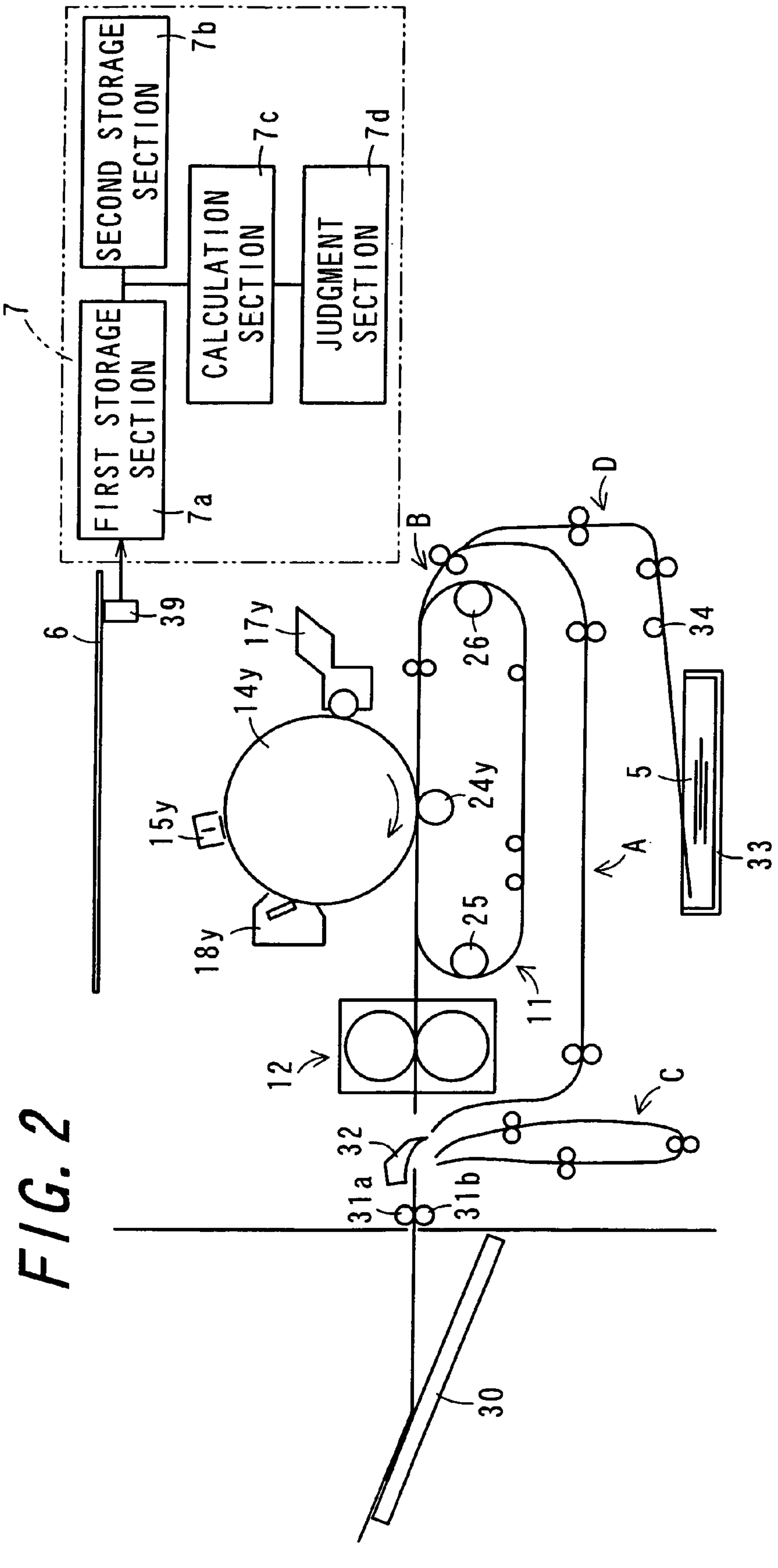
FIG. 2 is a schematic view showing a simplified configuration of a part of the image forming apparatus.

FIG. 1 is a cross-sectional view showing the configuration of an image forming apparatus 1 according to one embodiment of the invention. FIG. 2 is a schematic view showing the simplified configuration of a part of the image forming apparatus 1.

As shown in FIG. 1, the image forming apparatus 1 includes an image forming section 2 that forms an image on a printing medium 5 such as paper, a paper supply section 3 that supplies the printing medium 5 to the image forming section 2, and an image reading section 4 that reads an image on a document placed on a document platen 6. The image forming apparatus 1 also includes an operation section (not shown). The operation section includes a printing mode selecting section and a printing medium selecting section. The printing mode selecting section can select either one of a simplex printing mode in which image data is printed on only a first face, that is, only one face of the printing medium 5, and a duplex printing mode in which image data is printed on both of a first face of the printing medium 5 and a second face, which is the opposite face of the first face. The printing medium selecting section can select the type of the printing medium 5. A control unit 7 controls the operation of the image forming apparatus 1 according to each condition selected by these selecting sections. The control of the operation of the image forming apparatus 1 by the control unit 7 on will be described later. The image forming section 2, the paper supply section 3, the image reading section 4, and the operation section correspond to an output section.

The image forming section 2 includes image forming units 10*y*, 10*m*, 10*c*, and 10*k*, a transfer unit 11, a fixing unit 12, and a paper discharge unit 13.

The image forming units 10*y*, 10*m*, 10*c*, and 10*k* form toner images of the respective colors, by forming electrostatic latent images corresponding to image data of the respective colors on the surface of photoreceptors 14*y*, 14*m*, 14*c*, and 14*k* functioning as image bearing members, and then developing the electrostatic latent images. More specifically, the image forming unit 10*y* forms a toner image corresponding to yellow image data, the image forming unit 10*m* forms a toner image corresponding to magenta image data, the image forming unit 10*c* forms a toner image corresponding to cyan image data, and the image forming unit 10*k* forms a toner image corresponding to black image data.

The image forming units 10*y*, 10*m*, 10*c*, and 10*k* have the same configuration, except that the image forming units respectively use a yellow developer, a magenta developer, a cyan developer, and a black developer and that a pixel signal corresponding to a yellow component image, a pixel signal corresponding to a magenta component image, a pixel signal corresponding to a cyan component image, and a pixel signal corresponding to a black component image of image data input to the image forming section 2 are respectively input to the image forming units. Thus, as shown in FIG. 2, the image forming unit 10*y* corresponding to the yellow color is shown as a representative example, and a description of the other image forming units has been omitted. Herein, when each of the image forming units 10 corresponding to the respective colors is shown, the alphabet letter y (yellow), m (magenta), c (cyan), or k (black) is attached thereto. The image forming units 10*y*, 10*m*, 10*c*, and 10*k* are arranged in line in this order in the movement direction (sub-scanning direction) of a transport belt 23 functioning as a printing medium bearing member, that is, from the upstream side to the downstream side in the direction indicated by arrow 23*a*.

The image forming unit 10*y* includes the photoreceptor 14*y* functioning as a yellow toner image bearing member that bears a yellow toner image thereon, a charging section 15*y* that uniformly charges the surface of the photoreceptor 14*y*, an exposure unit 16*y* that forms an electrostatic latent image by exposing the surface of the charged photoreceptor 14*y* to light corresponding to image data, a developing section 17*y* that develops the electrostatic latent image formed on the surface of the photoreceptor 14*y* into a toner image by attaching toner to the electrostatic latent image, and a cleaning section 18*y* that removes and recovers toner that has not been transferred to the printing medium 5 by the transfer unit 11 described later and remains on the surface of the photoreceptor 14*y*.

The photoreceptor 14*y* is an image bearing member on an surface of which is borne an electrostatic latent image formed by exposure to light corresponding to image data, and can rotate freely. The photoreceptor 14*y* is supported and can rotate about the axis by a rotational drive section (not shown), and includes a cylindrical or columnar conductive substrate and a photosensitive layer formed on the surface of the conductive substrate. The rotational drive section of the photoreceptor 14*y* is controlled by the control unit 7, and thus the rotational speed of the photoreceptor 14*y* is controlled.

As the conductive substrate of the photoreceptor 14*y*, an aluminum bare tube or the like may be used. Also, the photosensitive layer may be layers made of a charge generating layer containing a charge generating substance and a charge transporting layer containing a charge transporting substance, or may be one layer containing a charge generating substance and a charge transporting substance. Furthermore, an undercoat layer may be provided between the photosensitive layer and the conductive substrate. Furthermore, a protection layer may be provided on the surface of the photosensitive layer. The photoreceptor 14*y* is rotationally driven clockwise with respect to the sheet of FIG. 1.

The charging section 15*y* charges the surface of the photoreceptor 14*y* to a potential having a predetermined polarity. In this embodiment, the charging section 15*y* charges the photoreceptor 14*y* using a non-contact corona charging. Herein, the charging section is not limited to a charging section using the non-contact corona charging mentioned above, and also may be contact charging sections such as charging rollers or charging brushes.

The exposure unit 16*y* receives input of a pixel signal corresponding to the yellow color of input image data, and includes a semiconductor laser element (not shown) that emits laser light, which is dot light modulated according to the pixel signal, a polygon mirror 19*y* for deflecting the laser light from the semiconductor laser element into the main scanning direction, an fθ lens 20*y* for forming an image of the laser light deflected by the polygon mirror 19*y* on the surface of the photoreceptor 14*y*, and a plurality of mirrors 21*y* and 22*y*. The exposure unit 16*y* irradiates the surface of the photoreceptor 14y with laser light, to form an electrostatic latent image corresponding to yellow image data on the surface of the photoreceptor 14y.

The developing section 17y faces the photoreceptor 14y, and develops an electrostatic latent image on the photoreceptor 14y formed by the exposure unit 16y into a toner image by supplying toner to the photoreceptor 14y. The developing section 17y is in contact with the surface of the photoreceptor 14y and can be rotationally driven about the axis. The developing section 17y includes a developing roller that supplies yellow toner to an electrostatic latent image on the surface of the photoreceptor 14y, a toner container that contains yellow toner, and an agitating roller that can be rotationally driven about the axis inside the toner container and supplies yellow toner to the surface of the developing roller.

The yellow toner contained in the toner container is charged by friction through agitation of the agitating roller, and supplied to the developing roller. Herein, the developing roller internally contains a fixed magnetic pole, and is supported by the toner container so as to rotate counterclockwise with respect to the sheet of FIG. 1. A development bias application section (not shown) applies a development bias having the polarity the same as that of the toner to the developing roller.

The yellow toner supplied to the surface of the developing roller is then supplied to an electrostatic latent image on the surface of the photoreceptor 14y utilizing, for example, the potential difference between the photoreceptor 14y and the developing roller, and forms a toner image corresponding to yellow image data.

After the yellow toner image on the surface of the photoreceptor 14y has been transferred to the printing medium 5 that is borne on and transported by the transport belt 23 described later, the cleaning section 18y removes and recovers yellow toner remaining on the surface of the photoreceptor 14y.

Hereinafter, the operation of the image forming unit 10y will be described. First, while the photoreceptor 14y is rotationally driven about the axis, the charging section 15y charges the surface of the photoreceptor 14y to, for example, −600 V. Next, the charged surface of the photoreceptor 14y is irradiated with laser light corresponding to yellow image data from the exposure unit 16y, and an electrostatic latent image having an exposure potential of −250 V corresponding to the yellow image data is formed. Then, yellow toner supplied to the surface of the developing roller of the developing section 17y is brought into contact with the surface of the photoreceptor 14y. A direct-current voltage of −450 V has been applied as a development bias to the developing roller, and thus the negatively charged yellow toner is attached to the electrostatic latent image due to the potential difference between the developing roller and the photoreceptor 14y, and a yellow toner image is formed on the surface of the photoreceptor 14y. The yellow toner image formed on the surface of the photoreceptor 14y is transferred, as described later, to the printing medium 5 that is pressed against the surface of the photoreceptor 14y and borne on and transported by the transport belt 23 driven in the direction indicated by arrow 23a. After the toner image has been transferred to the printing medium 5, yellow toner remaining on the surface of the photoreceptor 14y is removed and recovered by the cleaning section 18y.

The transfer unit 11 includes the transport belt 23 functioning as a printing medium bearing member, transfer sections 24y, 24m, 24c, and 24k, a driving roller 25 functioning as a printing medium bearing member drive section, and a driven roller 26.

The transport belt 23 abuts against the photoreceptors 14y, 14m, 14c, and 14k functioning as a plurality of image bearing members, and is a printing medium bearing member that bears and transports the printing medium 5 to which toner images formed on the photoreceptors 14y, 14m, 14c, and 14k are transferred and overlaid. The transport belt 23 is an endless belt that is stretched between the driving roller 25 functioning as a printing medium bearing member drive section that drives the transport belt 23 and the driven roller 26, and that forms a looped movement path. The transport belt 23 is driven in the sub-scanning direction, that is, the direction indicated by arrow 23a.

The transport belt 23 is pressed against the photoreceptors 14y, 14m, 14c, and 14k. Toner images of the respective colors are transferred to the positions where the transport belt 23 is pressed against the photoreceptors 14y, 14m, 14c, and 14k. The transfer sections 24y, 24m, 24c, and 24k are arranged at the positions where opposed to the photoreceptors 14y, 14m, 14c, and 14k in a state where the transport belt 23 is interposed.

Each of the transfer sections 24y, 24m, 24c, and 24k is pressed against the transport belt 23, and includes a transfer driving roller rotating about the axis by a drive section (not shown), a transfer driven roller that is driven by the rotation of the transfer driving roller, and a transport belt that is stretched between the transfer driving roller and the transfer driven roller. Furthermore, a transfer bias having the polarity opposite to that of the toner is applied to the transfer sections 24y, 24m, 24c, and 24k such that toner images formed on the surface of the photoreceptors 14y, 14m, 14c, and 14k are transferred to the printing medium 5 that is borne on and transported by the transport belt 23.

With the transfer bias applied to the transfer sections 24y, 24m, 24c, and 24k, a high voltage is uniformly applied to the transport belt 23 and the printing medium 5 that is borne on and transported by the transport belt 23. Accordingly, yellow, magenta, cyan, and black toner images formed on the photoreceptors 14y, 14m, 14c, and 14k are successively transferred and overlaid on the printing medium 5, and a multicolored toner image is formed on the printing medium 5. Herein, when only a part of yellow, magenta, cyan, and black image data is input, a toner image is formed at only an image forming unit corresponding to the color of the input image data, among the image forming units 10y, 10m, 10c, and 10k.

The driving roller 25 is a printing medium bearing member drive section that drives the transport belt 23. The driving roller 25 is controlled by the control unit 7, and thus the speed of the transport belt 23 moved by the rotation of the driving roller 25 is controlled. The driven roller 26 rotates by being driven by the rotation of the driving roller 25 while applying a predetermined tension to the transport belt 23 such that the transport belt 23 is not loosened.

A charge eliminating section 27 is provided between the image forming unit 10k and the fixing unit 12 described later. An alternating-current voltage application section (not shown) causes an alternating current to flow through the charge eliminating section 27, and thus the printing medium 5 electrostatically attracted to the transport belt 23 is separated from the transport belt 23.

The transfer unit 11 transfers and overlays toner images of the respective colors formed on the photoreceptors 14y, 14m, 14c, and 14k at a predetermined position on the printing medium 5 that is borne on and transported by the transport belt 23, thereby forming a multicolored toner image. This toner image is fixed by the fixing unit 12 onto the printing medium 5.

The fixing unit 12 is provided with a heat roller 28 and a pressure roller 29. The heat roller 28 can rotate about the axis by a drive section (not shown). A heater such as a halogen lamp is provided inside the heat roller 28. The pressure roller 29 is pressed against the heat roller 28. In the fixing unit 12, the printing medium 5 to which a toner image has been transferred by the transfer unit 11 is transported to a portion in which the heat roller 28 and the pressure roller 29 are pressed against each other, and is heated and pressed by the heat roller 28 and the pressure roller 29. With this sort of thermal fixing, the toner image transferred to the printing medium 5 is fixed to the printing medium 5.

The paper discharge unit 13 includes a paper discharge tray 30, that is provided outside a casing of the image forming apparatus 1, paper discharge rollers 31*a* and 31*b* that are provided in the vicinity of the paper discharge tray 30, and a switch 32 that is provided between the paper discharge rollers 31*a* and 31*b* and the fixing unit 12. When a simplex printing mode is selected by the printing mode selecting section, the control unit 7 switches the switch 32 such that the printing medium 5 on which a toner image has been fixed to only the first face thereof by the fixing unit 12 is directly discharged out of the image forming apparatus 1. The printing medium 5 on which the toner image has been fixed to only the first face thereof is transported along a transport path to which the switch 32 is switched, sent by the paper discharge rollers 31*a* and 31*b*, and discharged out of the image forming apparatus 1 to be placed on the paper discharge tray 30.

On the other hand, when a duplex printing mode is selected by the printing mode selecting section, first, the control unit 7 switches the switch 32 such that the printing medium 5 on which a toner image has been fixed to the first face thereof by the fixing unit 12 is directly discharged out of the image forming apparatus 1. The printing medium 5 on which the toner image has been fixed to the first face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to a transport path A. The printing medium 5 partially discharged out of the image forming apparatus 1 is moved in the reverse direction by the reverse rotation of the paper discharge rollers 31*a* and 31*b* and transported to the transport path A. Further, in order to form an image on the second face, the printing medium 5 is transported to a transport path B including a plurality of registration rollers such that the second face abuts against the photoreceptors 14*y*, 14*m*, 14*c*, and 14*k*, and a toner image is fixed to the second face.

When the printing medium 5 is not to be reversed, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is transported along a transport path to which the switch 32 is switched, sent by the paper discharge rollers 31*a* and 31*b*, and discharged out of the image forming apparatus 1 to be placed on the paper discharge tray 30.

On the other hand, when the printing medium 5 is to be reversed, first, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to a transport path C. The printing medium 5 partially discharged out of the image forming apparatus 1 is moved in the reverse direction by the reverse rotation of the paper discharge rollers 31*a* and 31*b* and transported to the transport path C. Then, the control unit 7 switches the switch 32 such that the printing medium 5 having passed through the transport path C is discharged out of the image forming apparatus 1. The printing medium 5 having passed through the transport path C is transported along a transport path to which the switch 32 is switched, sent by the paper discharge rollers 31*a* and 31*b*, and discharged out of the image forming apparatus 1 to be placed on the paper discharge tray 30.

The transport paths A, B, and C are provided in the paper supply section 3. The transport path C is a printing medium reversing section for reversing the first face and the second face of the printing medium 5 after duplex printing. When this sort of printing medium reversing section is provided, printing media after the duplex printing can be arranged in the same order as in the case where the media are printed in a predetermined order of printing, without requiring effort to manually reverse the first face and the second face of the printing media 5 before forming a booklet, for example, in a case where the order of printing of image data is different from the predetermined order of printing. Thus, the time necessary for forming a booklet can be shortened.

Note that it is not necessary to select a simplex printing mode or a duplex printing mode in each image formation. When a printing mode is not selected by the printing mode selecting section, image formation is performed, for example, assuming that any one of a printing mode stored in a printing mode storage section that stores a printing mode in the previous image formation, a frequently used printing mode, a predetermined printing mode, and the like has been selected.

The paper supply section 3 includes the transport paths A, B, C and D a printing media cassette 33 that contains the printing media 5, a pickup roller 34 that sends the printing media 5 sheet by sheet to a transport path D, and a plurality of pairs of registration rollers that send the printing media 5 to a transfer position that is a portion in which the transfer section 24*y* and the photoreceptor 14*y* are pressed against each other, in synchronization with transportation of a toner image on the photoreceptor 14*y* to the transfer position.

In the paper supply section 3, the printing media 5 contained in the printing media cassette 33 are sent sheet by sheet by the pickup roller 34 to the transport path D, and then sent by the plurality of pairs of registration rollers to the transfer position that is a portion in which the transfer section 24*y* and the photoreceptor 14*y* are pressed against each other.

The image reading section 4 reads an image on a document placed on the document platen 6, and generates image data. An upper face of the document platen 6 serves as a document placing face on which a document is placed. A document may be placed on the document platen 6, manually by a user, or by a reversing automatic document feeder (RADF) 35. The reversing automatic document feeder 35 also serves as a cover member for covering the upper face of the document platen 6, and is hinged to the casing of the image forming apparatus 1 so that the upper face of the document platen 6 can be opened and closed.

The reversing automatic document feeder 35 transports a document such that one face of the document is placed in opposition to the image reading section 4 at a predetermined position on the document platen 6. After an image on the one face is completely read, the reversing automatic document feeder 35 reverses the document and transports the reversed document to the document platen 6 such that the other face is placed in opposition to the image reading section 4 at a predetermined position on the document platen 6. After images on both faces of one document are completely read, the reversing automatic document feeder 35 discharges the document, and then performs the above-described transport operation for the next document in a repeated manner. The transportation and the operation of reversing the surface and the back face of a document performed by the reversing automatic document feeder 35 are controlled by the control unit 7 in relation to the overall operation of the image forming apparatus 1.

The image reading section 4 is provided below the document platen 6 in order to read an image on a document placed on the document platen 6 and generate image data. The image reading section 4 includes a first document scanning unit 36 and a second document scanning unit 37 that move back and forth in parallel to the lower face of the document platen 6, an optical lens 38, and a CCD (charge coupled device) line sensor 39 that is a photoelectric conversion element.

The first document scanning unit 36 includes an exposure lamp that exposes a document image on a document face opposed to the image reading section 4, and a first mirror that deflects reflected optical image from the document toward the second document scanning unit 37, and moves back and forth at a constant scanning speed in parallel to the lower face of the document platen 6 while keeping a constant distance therefrom. The second document scanning unit 37 includes a second and a third mirror that deflect, toward the optical lens 38, the reflected optical image from the document deflected by the first mirror of the first document scanning unit 36, and moves back and forth in parallel to the first document scanning unit 36 while keeping a constant relationship in speed with the first document scanning unit 36.

The optical lens 38 reduces the reflected optical image from the document deflected by the third mirror of the second document scanning unit 37, and forms an image of the reduced optical image at a predetermined position on the CCD line sensor 39. The CCD line sensor 39 reads a monochrome image or a color image, and successively converts the formed optical image of the image to electric signals of the respective colors through photoelectric conversion. Then, image data based on these electric signals is generated and output to the exposure units 16*y*, 16*m*, 16*c*, and 16*k*. Furthermore, for example, image data for a plurality of lines (e.g., 10 lines) in the vicinity of the center portion in the document image that is read first is output to the control unit 7. The CCD line sensor 39 corresponds to an input section and a reading section.

Herein, the image data that is output to the exposure units 16*y*, 16*m*, 16*c*, and 16*k* and the control unit 7 is not limited to image data input by the CCD line sensor 39, and image data also may be used that is generated by an external device such as a personal computer (not shown) connected to the image forming apparatus 1, for example. The image forming apparatus 1 is provided with an interface for data communication with the personal computer. The personal computer uses the interface to output image data to the exposure units 16*y*, 16*m*, 16*c*, and 16*k*, and to output image data for a plurality of lines (e.g., 10 lines) in the vicinity of the center portion to the control unit 7. The interface corresponds to an input section and a reading section.

The control unit 7 is constituted by a microcomputer mainly based on a central processing unit (hereinafter, referred to as a "CPU"), and includes a first storage section 7*a*, a second storage section 7*b*, a calculation section 7*c*, and a judgment section 7*d*, as shown in FIG. 2. The CCD line sensor 39 or the interface, the first storage section 7*a*, the second storage section 7*b*, and the calculation section 7*c* correspond to determination sections.

The first storage section 7*a* stores image data for a plurality of lines in the vicinity of the center portion input from the CCD line sensor 39 or the personal computer. The second storage section 7*b* stores, in advance, table data T1 that indicates the relationship between the coverage and the background density of the image data, and table data T2 that indicates the relationship between the background density of the image data and the difference in printing density between the first face and the second face of the printing medium 5 after duplex printing. Also, the second storage section 7*b* stores a predetermined threshold value.

The calculation section 7*c* obtains density values of pixels based on the image data for a plurality of lines in the vicinity of the center portion stored in the first storage section 7*a*, and calculates the coverage of the image data based on the total of the density values. Herein, the coverage of the image data refers to a value obtained by taking the coverage of solid image data as 100%, and taking the coverage of white image data on which no printing has been performed as 0%. The coverage of ordinary text image data is 5 to 6%, and the coverage of image data in a halftone region is approximately 20%.

Next, the calculation section 7*c* calls the table data T1 stored in the second storage section 7*b*, performs a table search based on this table data T1, and obtains a value of the background density of the image data corresponding to the calculated coverage of the image data. Then, the calculation section 7*c* calls the table data T2 stored in the second storage section 7*b*, performs a table search based on this table data T2, and obtains a value of the difference in printing density between the first face and the second face of the printing medium 5 after duplex printing, the value corresponding to the obtained value of the background density of the image data.

Next, the judgment section 7*d* judges whether or not the value of the difference in printing density obtained by the calculation section 7*c* is larger than the predetermined threshold value, and then judges the order of printing of the image data in the following manner based on the judgment result.

Figure 4:
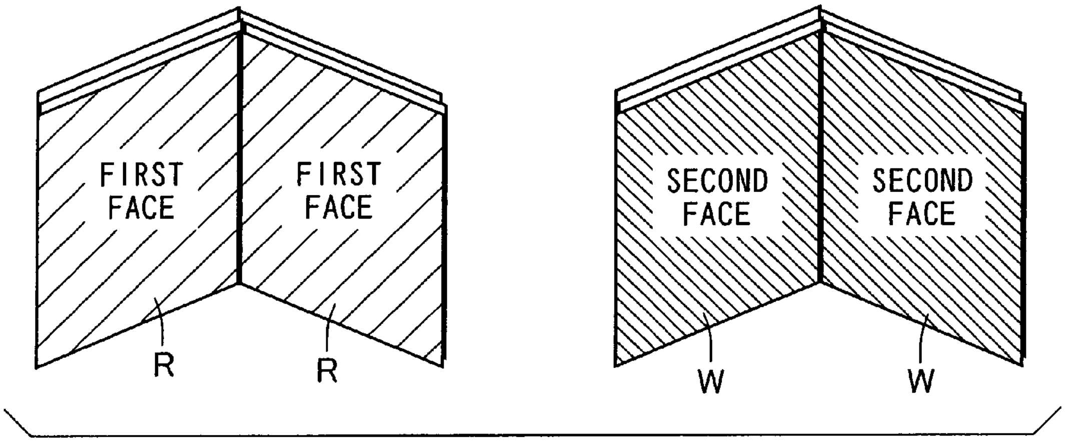
FIG. 4 is a schematic view showing a state in which a booklet formed after duplex printing performed by the image forming apparatus of the invention is open.

FIG. 3 is a view showing the relationship between the order, of printing in the image forming apparatus 1 of the invention and the page number of a formed booklet. FIG. 4 is a schematic view showing a state in which the booklet formed after the duplex printing performed by the image forming apparatus 1 of the invention is open. Hereinafter, a method in which the judgment section 7*d* judges the order of printing of image data will be described using, as an example, the case where a series of pieces of image data generated from eight document images having an equal background density arranged in the order A, B, C, D, E, F, G, and then H is printed by duplex printing on four sheets of printing medium 5. In a memory (not shown) constituted by a RAM (random access memory) or the like provided in the control unit 7, the order of reading of the document images with the CCD line sensor 39, in this case, the order A, B, C, D, E, F, G, and then H is stored as a predetermined order of printing. Alternatively, when a series of pieces of image data input from a personal computer or the like is to be printed, the order of generation of the image data is stored as a predetermined order of printing in stead of the above-described order of reading. Furthermore, this memory stores a predetermined printing order change pattern.

When the judgment section 7*d* judges that a value of the difference in printing density between the first face and the second face of the printing medium 5 after duplex printing obtained by the calculation section 7*c* is equal to or smaller than the predetermined threshold value, the judgment section 7*d* judges not to change the predetermined order of printing. The control unit 7 controls the order of printing of the image data based on the judgment performed by the judgment section 7*d*. The image forming section 2, the paper supply section 3, the image reading section 4, and the operation section print the series of pieces of image data on the printing media 5 in the predetermined order of printing. Then, the printed materials are stapled on the left side to be formed into a booklet. In the thus formed booklet, a difference in printing density between the first face and the second face of the printing media 5 after duplex printing is small, and thus a difference in fog or image density is small throughout all pages. Accordingly, a difference in fog or image density is small between two facing pages of a booklet formed after the duplex printing.

On the other hand, when the judgment section 7*d* judges that a value of the difference in printing density between the first face and the second face of the printing medium 5 after duplex printing obtained by the calculation section 7*c* is larger than the predetermined threshold value, the judgment section 7*d* judges to change the predetermined order of printing into the order A, B, D, C, E, F, H, and then G, that is, to change the order of printing of the image data on each even-numbered printing medium 5 into the reverse order of the predetermined order of printing, following the printing order change pattern stored in advance in the memory, as shown in the printing media model after duplex printing in FIG. 3. The control unit 7 controls the order of printing of the image data based on the judgment performed by the judgment section 7*d*. The image forming section 2, the paper supply section 3, the image reading section 4, and the operation section print the image data on the printing media 5 in the changed order of printing. Then, the printed materials are stapled on the left side to be formed into a booklet. In the thus formed booklet, as shown in FIG. 4, the second page and the third page, the fourth page and the fifth page, and the sixth page and the seventh page, that is, two facing right and left pages are obtained as the combination of the first faces R or the second faces W of the printing media 5. Thus, the left and right pages have a similar level of fog or image density. Accordingly, even in a case where a difference in printing density is large between the first face and the second face of the printing medium 5 after duplex printing, sense of visual incongruity when the booklet is open is made smaller.

In this manner, when the judgment section 7*d* judges that the difference in printing density between the first face and the second face of the printing medium after duplex printing, determined by the CCD line sensor 39 or the interface, the first storage section 7*a*, the second storage section 7*b*, and the calculation section 7*c* functioning as determination sections, is larger than the predetermined threshold value, the judgment section 7*d* judges to change the predetermined order of printing. Thus, even in a case where a difference in printing density is large between the first face and the second face of the printing medium 5 after duplex printing, a difference in fog or image density between two facing pages of a booklet formed after the duplex printing can be eliminated, and thus a sense of visual incongruity can be made smaller.

Furthermore, when the determination sections are provided, from information of image data for a plurality of lines in the vicinity of the center portion, it is possible to easily calculate the accurate difference in printing density between the first face and the second face of the printing medium 5 after duplex printing corresponding to the information. Thus, a difference in fog or image density between two facing pages of a booklet formed after the duplex printing can be reduced, and thus a sense of visual incongruity can be made smaller.

The above-mentioned threshold value is preferably set to 0.05 or more, for example, in a case where the value is obtained through measurement using a Macbeth reflection densitometer (product name: RD-914, manufactured by Macbeth). When the difference in printing density between the first face and the second face of the printing medium after duplex printing is equal to or smaller than 0.05, the difference is not noticeable to human eyes. In this manner, when the threshold value is set to the minimum value or more at which the difference in printing density is recognized as a sense of visual incongruity, a sense of visual incongruity derived from a difference in fog or image density between two facing pages of a booklet formed after the duplex printing can be made smaller.

It should be noted that the printing order change pattern is not limited to the above-described pattern. For example, a pattern also may be used following which the order of printing of data on each odd-numbered printing medium 5 is changed into the reverse order of the predetermined order of printing.

Figure 5:
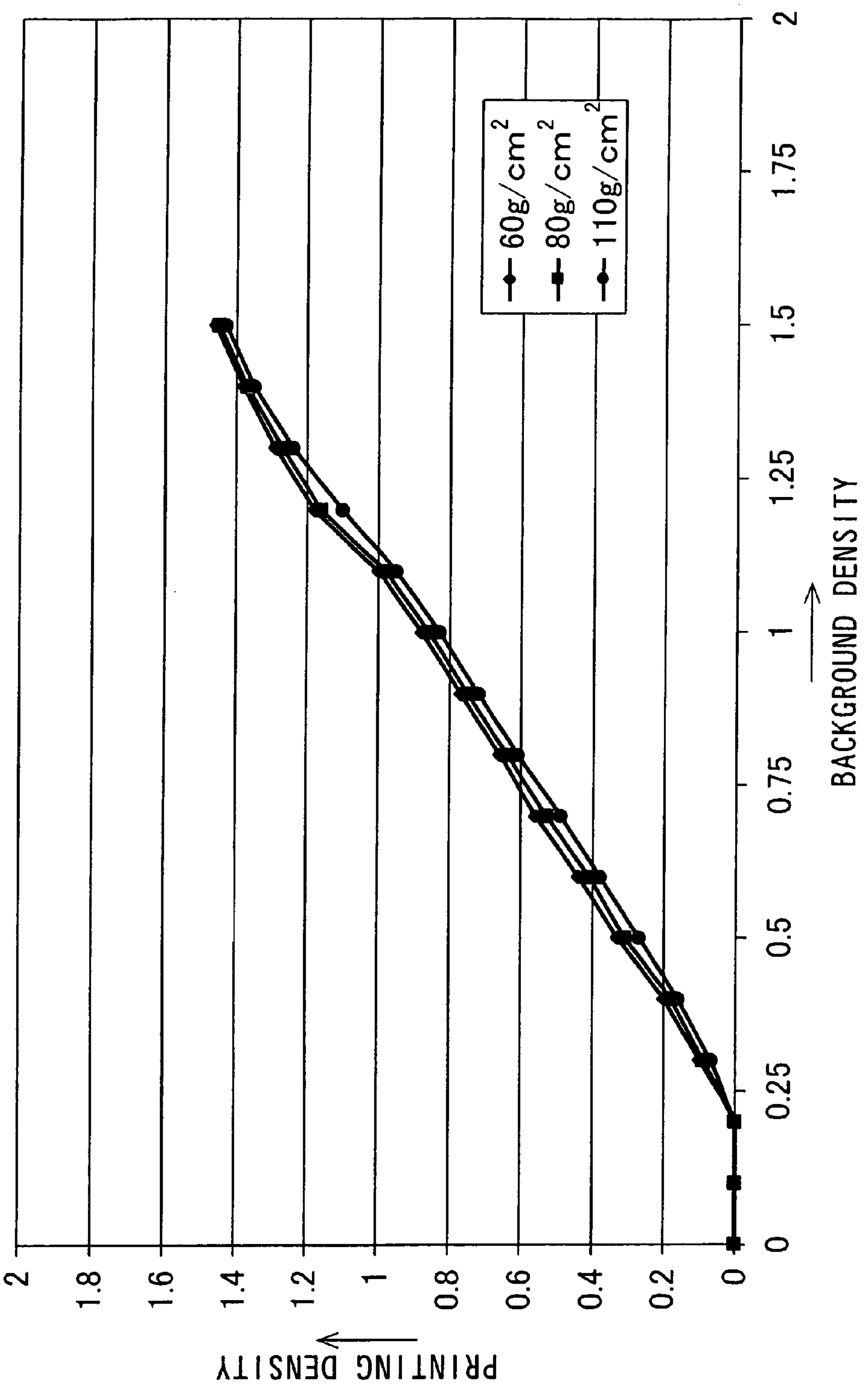
FIG. 5 is a graph showing a relationship between background density of a document image and printing density on a first face of a printing medium, in the printing media having different thicknesses.
Figure 6A:
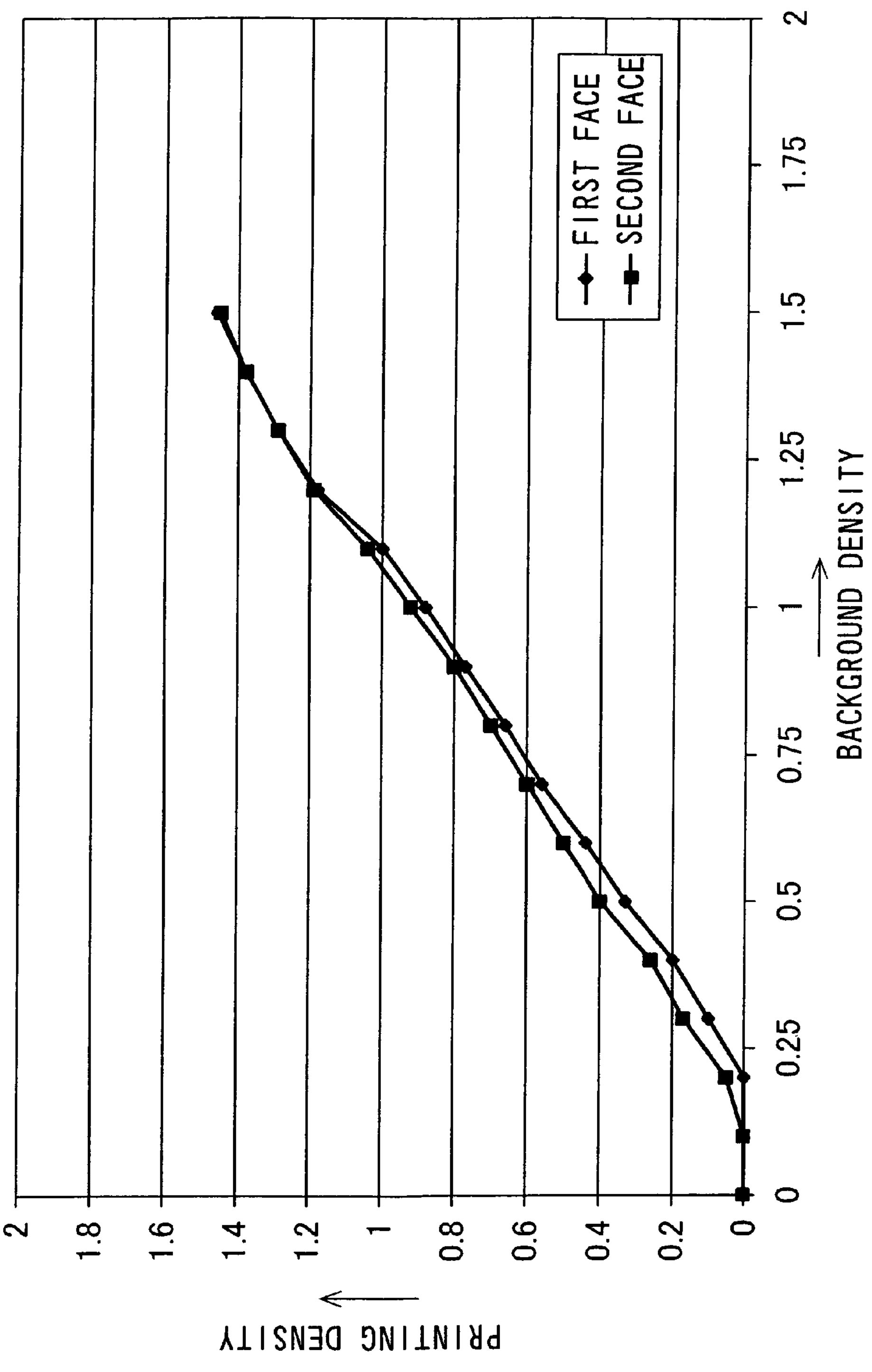
FIG. 6A is a graph showing a relationship between the background density of the document image and printing density on the first face and a second face of the printing medium after duplex printing.
Figure 6B:
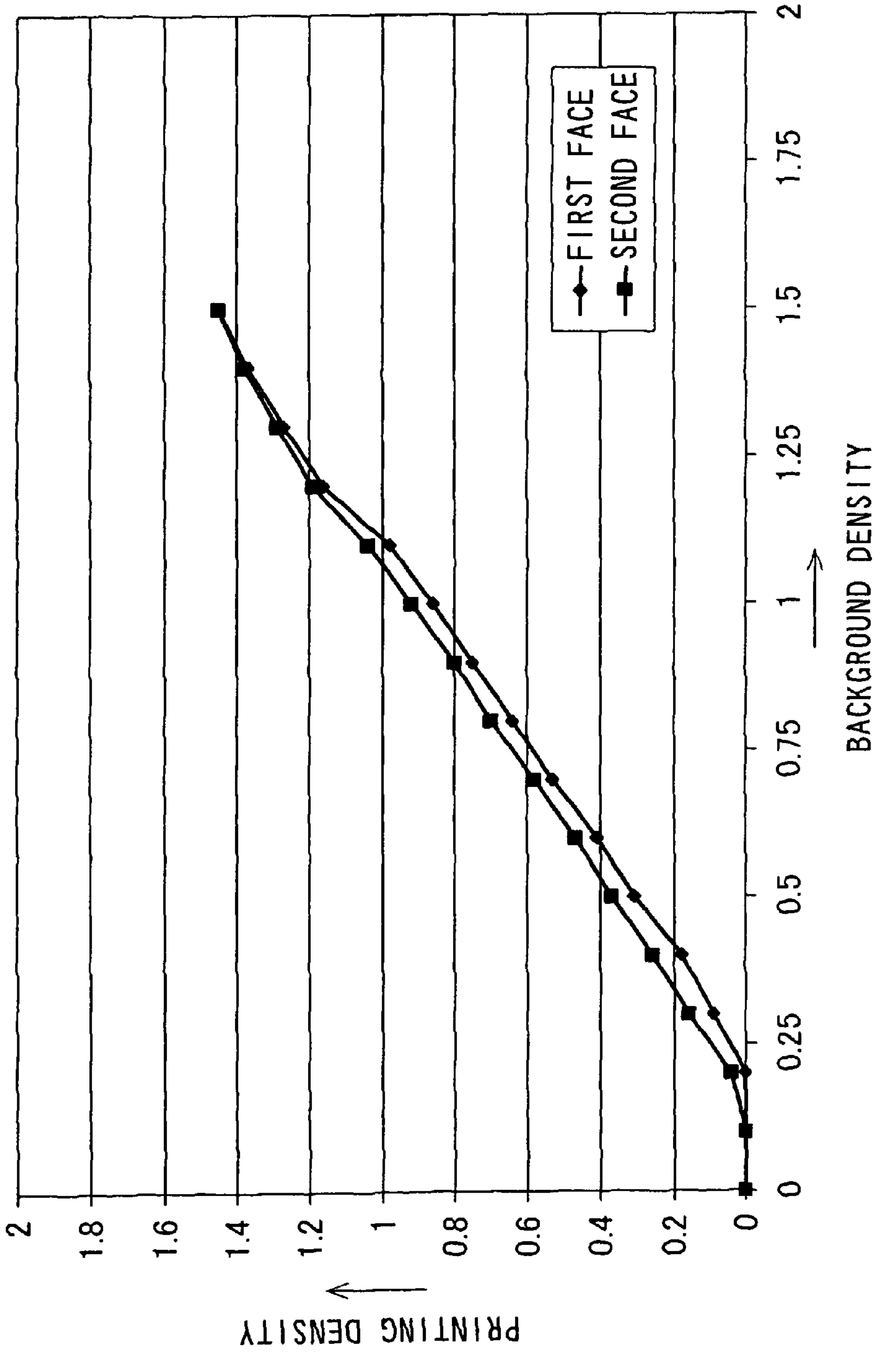
FIG. 6B is a graph showing the relationship between the background density of the document image and the printing density on the first face and the second face of the printing medium after the duplex printing.
Figure 6C:
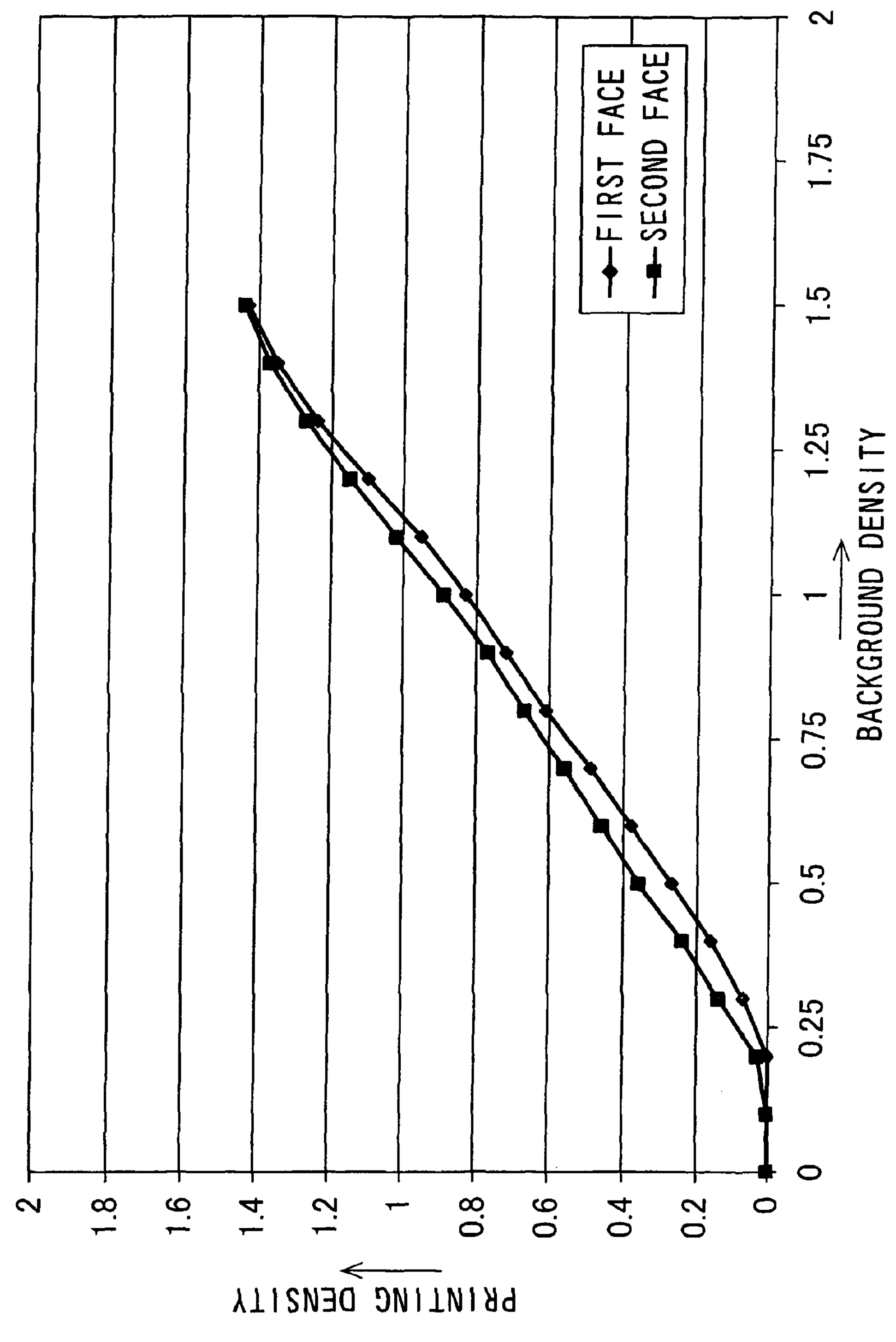
FIG. 6C is a graph showing the relationship between the background density of the document image and the printing density on the first face and the second face of the printing medium after the duplex printing.

FIG. 5 is a graph showing the relationship between the background density of a document image and the printing density on the first face of the printing medium 5, in the printing media 5 having different thicknesses. FIGS. 6A to 6C are graphs showing the relationship between the background density of a document image and the printing densities on the first face and the second face of the printing medium 5 after duplex printing. FIG. 6A shows a graph for the printing medium 5 having a thickness (basis weight) of 60 g/cm$^2$. FIG. 6B shows a graph for the printing medium 5 having a thickness (basis weight) of 80 g/cm$^2$. FIG. 6C shows a graph for the printing medium 5 having a thickness (basis weight) of 110 g/cm$^2$. The background densities and the printing densities in FIGS. 5 and 6A to 6C are values obtained through measurement using a Macbeth reflection densitometer (product name: RD-914, manufactured by Macbeth).

As shown in FIG. 5, as the printing medium 5 is thicker, a value of the printing density on the first face is smaller. The reason for this is that an effective transfer voltage value of the printing medium 5 varies depending on the thickness of the printing medium 5, and thus transfer efficiency in image formation varies. Furthermore, as shown in FIGS. 6A to 6C, as the printing medium 5 is thicker, a value of the difference in printing density between the first face and the second face of a printing medium after duplex printing is larger. In this manner, when the thickness of the printing medium 5, that is, the type of the printing medium 5 varies, the value of the printing density after printing, and the value of the difference in printing density between the first face and the second face of the printing medium after duplex printing also vary. Thus, it is preferable to change the table data T2 that indicates the relationship between the background density of image data and the difference in printing density between the first face and the second face of the printing medium after duplex printing, according to the type of the printing medium 5. More specifically, the second storage section 7*b* stores a plurality of pieces of table data T2 that indicate the relationship between the background density of image data and the difference in printing density, according to the types of the printing media 5. Then, when a user selects the type of the printing medium 5 using the printing medium selecting section provided in the operation section, the calculation section 7*c* calls the table data T2 corresponding to the selected printing medium 5, and performs the above-described calculation based on this table data T2.

In this manner, it is preferable that the second storage section 7*b* stores a plurality of pieces of table data T2 that indicate the relationship between the background density of image data and the difference in printing density between the first face and the second face of the printing medium after duplex printing, according to the types of the printing medium 5. Thus, the calculation section 7*c* can calculate the difference in printing density corresponding to information of image data for a plurality of lines in the vicinity of the center portion stored in the first storage section, based on the relationship between the background density of image data and the difference in printing density according to the type of the printing medium 5. Thus, even in a case where the type of the printing medium 5 is changed, a difference in fog or image density between two facing pages of a booklet formed after the duplex printing can be eliminated, and thus a sense of visual incongruity can be made smaller.

Furthermore, a plurality of threshold values may be determined in advance according to the types of the printing medium 5. In this case, when a user selects the type of the printing medium 5 using the printing medium selecting section provided in the operation section, the calculation section 7*c* calls the threshold value corresponding to the selected printing medium 5 from the second storage section 7*b*, and performs the above-described calculation based on this threshold value.

Note that it is not necessary to select the type of the printing medium 5 in each image formation. When the type of the printing medium 5 is not selected by the printing medium selecting section, image formation is performed, for example, assuming that any one of a type of the printing medium 5 stored in a printing medium storage section that stores a type of the printing medium 5 used in the previous image formation, a frequently used type of the printing medium 5, a predetermined type of the printing medium 5, and the like has been selected.

Hereinafter, the operation of the image forming apparatus 1 when a simplex printing mode is selected by the printing mode selecting section will be described.

The CCD line sensor 39 of the image reading section 4 generates a series of pieces of image data, by successively reading a plurality of document images having an equal background density placed on the document platen 6 manually or using a reversing automatic document feeder (RADF), and outputs the image data to the exposure units 16*y*, 16*m*, 16*c*, and 16*k*.

Alternatively, a personal computer (not shown) connected to the image forming apparatus 1 generates a series of pieces of image data, and outputs the image data to the exposure units 16*y*, 16*m*, 16*c*, and 16*k*.

Then, simplex printing is performed on the printing medium 5 through an image forming process as described below.

In the image forming apparatus 1, the image forming units 10*y*, 10*m*, 10*c*, and 10*k* included in the image forming section 2 form toner images of the respective colors corresponding to the input image data, on the surface of the photoreceptors 14*y*, 14*m*, 14*c*, and 14*k*. The transfer unit 11 transfers the toner images on the photoreceptors 14*y*, 14*m*, 14*c*, and 14*k*, to the printing medium 5 that is supplied by the paper supply section 3 and borne on and transported by the transport belt 23, thereby forming a multicolored toner image. The fixing unit 12 fixes the multicolored toner image transferred to the printing medium 5, to the printing medium 5 with heat and pressure applied by the heat roller 28 and the pressure roller 29.

When the toner image is fixed to only the first face that is one face of the printing medium 5, the control unit 7 switches the switch 32 such that the printing medium 5 on which the toner image has been fixed to only the first face thereof is directly discharged out of the image forming apparatus 1. The printing medium 5 on which the toner image has been fixed to only the first face thereof is transported along a transport path to which the switch 32 is switched, sent by the paper discharge rollers 31*a* and 31*b*, and discharged out of the image forming apparatus 1 to be placed on the paper discharge tray 30.

Hereinafter, the operation of the image forming apparatus 1 when a duplex printing mode is selected by the printing mode selecting section will be described.

The CCD line sensor 39 of the image reading section 4 generates a series of pieces of image data, by successively reading a plurality of document images having an equal background density placed on the document platen 6 manually or using the reversing automatic document feeder (RADF), and outputs the image data to the exposure units 16*y*, 16*m*, 16*c*, and 16*k*. Alternatively, a personal computer (not shown) connected to the image forming apparatus 1 generates a series of pieces of image data, and outputs the image data to the exposure units 16*y*, 16*m*, 16*c*, and 16*k*. The CCD line sensor 39 or the personal computer outputs image data for a plurality of lines in the vicinity of the center portion to the control unit 7.

The first storage section 7*a* of the control unit 7 stores the image data for a plurality of lines in the vicinity of the center portion input from the CCD line sensor 39 or the personal computer.

The calculation section 7*c* of the control unit 7 obtains density values of pixels based on the image data for a plurality of lines in the vicinity of the center portion stored in the first storage section 7*a*, and calculates the coverage of the image data based on the total of the density values. Next, the calculation section 7*c* calls the table data T1 stored in advance in the second storage section 7*b*, the table data T1 indicating the relationship between the coverage and the background density of the image data, performs a table search based on this table data T1, and obtains a value of the background density of the image data corresponding to the calculated coverage of the image data. Then, the calculation section 7*c* calls, for example, the table data T2 corresponding to the printing medium 5 selected by the printing medium selecting section, among the plurality of pieces of table data T2 stored in advance in the second storage section 7*b*, the table data T2 indicating the relationship between the background density of the image data and the difference in printing density between the first face and the second face of the printing medium 5 after duplex printing, performs a table search based on this table data T2, and calculates a value of the difference in printing density corresponding to the obtained value of the background density.

The judgment section 7*d* judges whether or not the value of the difference in printing density between the first face and the second face of the printing medium 5 after duplex printing obtained by the calculation section 7*c* is larger than the predetermined threshold value. When the judgment section 7*d* judges that the value of the difference in printing density obtained by the calculation section 7*c* is equal to or smaller than the predetermined threshold value, the judgment section 7*d* judges not to change the predetermined order of printing.

On the other hand, when the judgment section 7*d* judges that the value of the difference in printing density is larger than the predetermined threshold value, the judgment section 7*d* judges to change, for example, the order of printing of the image data on each even-numbered printing medium 5 into the reverse order of the predetermined order of printing, following the printing order change pattern stored in advance in the memory.

The control unit 7 controls the order of printing of the image data based on the judgment performed by the judgment section 7*d*. The image forming section 2, the paper supply section 3, the image reading section 4, and the operation section perform duplex printing on the printing media 5 through an image forming process as described below, in the predetermined order of printing or the changed order of printing.

In the image forming apparatus 1, the image forming units 10*y*, 10*m*, 10*c*, and 10*k* included in the image forming section 2 form toner images of the respective colors corresponding to the input image data, on the surface of the photoreceptors 14*y*, 14*m*, 14*c*, and 14*k*. The transfer unit 11 transfers the toner images on the photoreceptors 14*y*, 14*m*, 14*c*, and 14*k*, to the printing medium 5 that is supplied by the paper supply section 3 and borne on and transported by the transport belt 23, thereby forming a multicolored toner image. The fixing unit 12 fixes the multicolored toner image transferred to the printing medium 5, to the printing medium 5 with heat and pressure applied by the heat roller 28 and the pressure roller 29.

When the toner image is fixed to the first face of the printing medium 5, the control unit 7 switches the switch 32 such that the printing medium 5 on which the toner image has been fixed to the first face thereof is directly discharged out of the image forming apparatus 1. The printing medium 5 on which the toner image has been fixed to the first face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to the transport path A. The printing medium 5 partially discharged out of the image forming apparatus 1 is moved in the reverse direction by the reverse rotation of the paper discharge rollers 31*a* and 31*b* and transported to the transport path A. Further, in order to form an image on the second face, the printing medium 5 is transported to the transport path B including a plurality of registration rollers such that the second face abuts against the photoreceptors 14*y*, 14*m*, 14*c*, and 14*k*, and a toner image is fixed to the second face as in the first face.

When the judgment section 7*d* judges not to change the predetermined order of printing, or when the judgment section 7*d* judges to change the predetermined order of printing and the order of printing of image data on the printing medium 5 is the same as the predetermined order of printing, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is transported along a transport path to which the switch 32 is switched, sent by the paper discharge rollers 31*a* and 31*b*, and discharged out of the image forming apparatus 1 to be placed on the paper discharge tray 30.

On the other hand, when the judgment section 7*d* judges to change the predetermined order of printing, and the order of printing of image data on the printing medium 5 is in the reverse order of the predetermined order of printing, first, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to the transport path C. The printing medium 5 partially discharged out of the image forming apparatus 1 is moved in the reverse direction by the reverse rotation of the paper discharge rollers 31*a* and 31*b* and transported to the transport path C. Then, the control unit 7 switches the switch 32 such that the printing medium 5 having passed through the transport path C is discharged out of the image forming apparatus 1. The printing medium 5 having passed through the transport path C is transported along a transport path to which the switch 32 is switched, sent by the paper discharge rollers 31*a* and 31*b*, and discharged out of the image forming apparatus 1 to be placed on the paper discharge tray 30.

In this manner, in the image forming apparatus 1 of the invention, the CCD line sensor 39 or the interface inputs a series of pieces of image data whose order of printing has been determined in advance. The CCD line sensor 39 or the interface, the first storage section 7*a*, the second storage section 7*b*, and the calculation section 7*c* determine the difference in printing density between the first face and the second face of the printing medium 5 after duplex printing. The judgment section 7*d* judges whether or not to change the order of printing based on the difference in printing density. The control unit 7 controls the order of printing of the image data based on the judgment. The image forming section 2, the paper supply section 3, the image reading section 4, and the operation section print the image data on the printing medium 5. When the judgment section 7*d* judges to change the order of printing, the image forming section 2, the paper supply section 3, the image reading section 4, and the operation section print the image data on the printing media in the order of printing that has been changed under control of the control unit.

Accordingly, a difference in fog or image density between two facing pages of a booklet formed after the duplex printing can be reduced without correction of parameters in, for example, development conditions or surface potential conditions. Thus, a sense of visual incongruity when the booklet is open can be made smaller.

Figure 7:
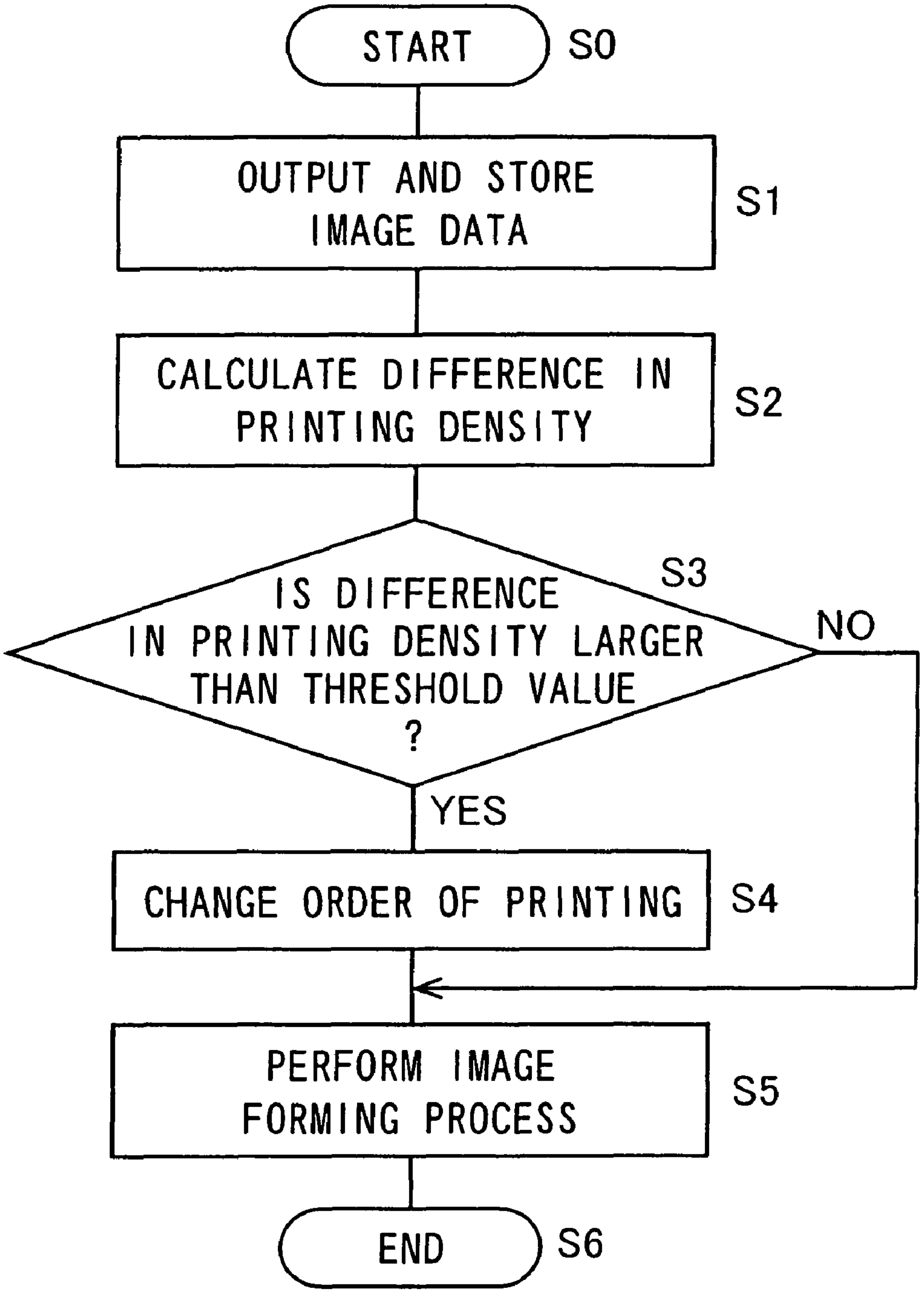
FIG. 7 is a flowchart showing an image forming method of the invention.
Figure 9:
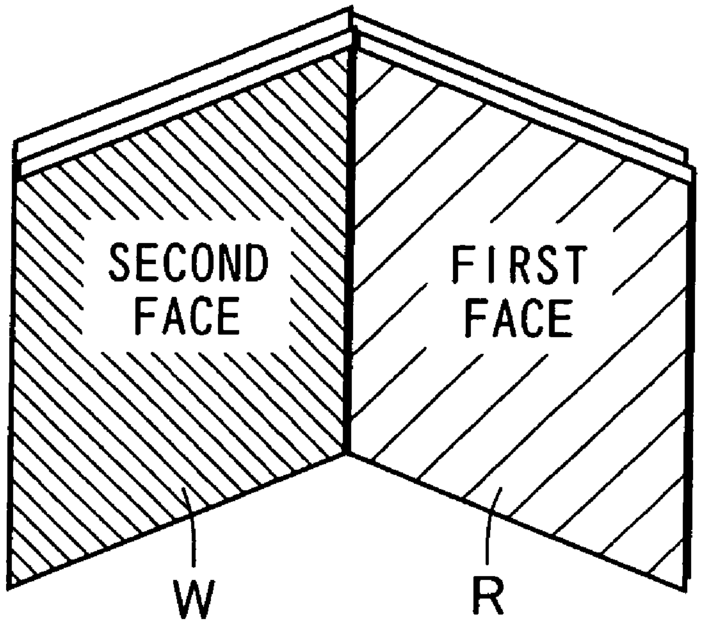
FIG. 9 PRIOR ART
FIG. 9 is a schematic view showing a state in which a booklet formed after duplex printing performed by the conventional image forming apparatus is open.

Hereinafter, an image forming method of the invention will be described using an example of the operation procedure of the image forming apparatus 1. FIG. 7 is a flowchart showing the image forming method of the invention.

In the image forming apparatus 1, for example, when a user inputs an instruction to operate a duplex printing mode using the printing mode selecting section provided in the operation section, and selects the type of the printing medium 5 using the printing medium selecting section, the procedure proceeds from step S0 to S1 to start a duplex printing operation, as shown in FIG. 7.

In step S1, the CCD line sensor 39 of the image reading section 4 generates a series of pieces of image data, by successively reading a plurality of document images having an equal background density placed on the document platen 6 using a reversing automatic document feeder (RADF), and outputs the image data to the exposure units 16*y*, 16*m*, 16*c*, and 16*k*. Then, image data for a plurality of lines (e.g., 10 lines) in the vicinity of the center portion in the document image that is read first is output to the control unit 7. The first storage section 7*a* of the control unit 7 stores the image data for a plurality of lines in the vicinity of the center portion input from the CCD line sensor 39.

In step S2, the calculation section 7*c* of the control unit 7 obtains density values of pixels of the CCD line sensor 39 based on the image data for a plurality of lines in the vicinity of the center portion stored in the first storage section 7*a*, and calculates the coverage of the image data based on the total of the density values. Next, the calculation section 7*c* calls the table data T1 stored in advance in the second storage section 7*b*, the table data T1 indicating the relationship between the coverage and the background density of the image data, performs a table search based on this table data T1, and obtains a value of the background density of the image data corresponding to the calculated coverage of the image data. Then, the calculation section 7*c* calls the table data T2 corresponding to the printing medium 5 selected by the printing medium selecting section, among the plurality of pieces of table data T2 stored in advance in the second storage section 7*b*, the table data T2 indicating the relationship between the background density of the image data and the difference in printing density between the first face and the second face of the printing medium 5 after duplex printing, performs a table search based on this table data T2, and obtains a value of the difference in printing density corresponding to the obtained value of the background density.

In step S3, the judgment section 7*d* judges whether or not the value of the difference in printing density between the first face and the second face of the printing medium 5 after duplex printing obtained by the calculation section 7*c* is larger than the predetermined threshold value, for example, 0.05 that is a value obtained through measurement using a Macbeth reflection densitometer (product name: RD-914, manufactured by Macbeth). When the judgment section 7*d* judges that the value of the difference in printing density obtained by the calculation section 7*c* is larger than the predetermined threshold value 0.05, the procedure proceeds to step S4 where the order of printing of the image data on each even-numbered printing medium 5 is changed into the reverse order of the order of reading of the document images, which is the predetermined order of printing, following the printing order change pattern stored in advance in the memory. The procedure proceeds to step S5.

On the other hand, when the judgment section 7*d* judges that the value of the difference in printing density obtained by the calculation section 7*c* is equal to or smaller than the predetermined threshold value 0.05, the judgment section 7*d* judges not to change the predetermined order of printing. The procedure proceeds to step S5. In this case, the order of printing of the image data is the same as the order of reading of the document images, which is the predetermined order of printing.

In step S5, the control unit 7 controls the order of printing of the image data based on the judgment performed by the judgment section 7*d*. The image forming section 2, the paper supply section 3, the image reading section 4, and the operation section perform image formation through an image forming process as described below, in the changed order of printing or the predetermined order of printing.

In the image forming apparatus 1, the image forming units 10*y*, 10*m*, 10*c*, and 10*k* included in the image forming section 2 form toner images of the respective colors corresponding to the image data input from the CCD line sensor 39, on the surface of the photoreceptors 14*y*, 14*m*, 14*c*, and 14*k*. The transfer unit 11 transfers the toner images on the photoreceptors 14*y*, 14*m*, 14*c*, and 14*k*, to the printing medium 5 that is supplied by the paper supply section 3 and borne on and transported by the transport belt 23, thereby forming a multicolored toner image. The fixing unit 12 fixes the multicolored toner image transferred to the printing medium 5, to the printing medium 5 with heat and pressure applied by the heat roller 28 and the pressure roller 29.

When the toner image is fixed to the first face of the printing medium 5, the control unit 7 switches the switch 32 such that the printing medium 5 on which the toner image has been fixed to the first face thereof is directly discharged out of the image forming apparatus 1. The printing medium 5 on which the toner image has been fixed to the first face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to the transport path A. The printing medium 5 partially discharged out of the image forming apparatus 1 is moved in the reverse direction by the reverse rotation of the paper discharge rollers 31*a* and 31*b* and transported to the transport path A. Further, in order to form an image on the second face, the printing medium 5 is transported to the transport path B including a plurality of registration rollers such that the second face abuts against the photoreceptors 14*y*, 14*m*, 14*c*, and 14*k*, and a toner image is fixed to the second face as in the first face.

When the judgment section 7*d* judges not to change the predetermined order of printing, or when the judgment section 7*d* judges to change the predetermined order of printing and the order of printing of image data on the printing medium 5 is the same as the predetermined order of printing, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is transported along a transport path to which the switch 32 is switched, sent by the paper discharge rollers 31*a* and 31*b*, and discharged out of the image forming apparatus 1 to be placed on the paper discharge tray 30.

On the other hand, when the judgment section 7*d* judges to change the predetermined order of printing, and the order of printing of image data on the printing medium 5 is in the reverse order of the predetermined order of printing, first, the control unit 7 switches the switch 32 such that the printing medium 5 on which the toner image has been fixed to the second face thereof by the fixing unit 12 is directly discharged out of the image forming apparatus 1. The printing medium 5 on which the toner image has been fixed to the second face thereof is sent by the paper discharge rollers 31*a* and 31*b*. Once the printing medium 5 is partially discharged out of the image forming apparatus 1, the control unit 7 switches the switch 32 such that the printing medium 5 partially discharged out of the image forming apparatus 1 is transported to the transport path C. The printing medium 5 partially discharged out of the image forming apparatus 1 is moved in the reverse direction by the reverse rotation of the paper discharge rollers 31*a* and 31*b* and transported to the transport path C. Then, the control unit 7 switches the switch 32 such that the printing medium 5 having passed through the transport path C is discharged out of the image forming apparatus 1. The printing medium 5 having passed through the transport path C is transported along a transport path to which the switch 32 is switched, sent by the paper discharge rollers 31*a* and 31*b*, and discharged out of the image forming apparatus 1 to be placed on the paper discharge tray 30.

When the image forming process in step S5 ends, the procedure proceeds to step S6, and the duplex printing ends.

In this manner, a series of pieces of image data whose order of printing has been determined in advance is input, the difference in printing density between the first face and the second face of the printing medium 5 after duplex printing is determined, it is judged based on the determined difference in printing density whether or not to change the order of printing, the order of printing of the image data is controlled based on the judgment, and the image data is printed on the printing medium. Accordingly, a difference in fog or image density between two facing pages of a booklet formed after the duplex printing can be reduced without correction of parameters in, for example, development conditions or surface potential conditions. Thus, a sense of visual incongruity when the booklet is open can be made smaller.

Furthermore, as shown in FIGS. 6A to 6C, the difference in printing density between the first face and the second face of the printing medium 5 after duplex printing becomes the largest in a halftone region having a background density of approximately 0.3 to 0.5. Furthermore, the difference in fog or image density when printing is performed using image data with a background density of a halftone region is likely to appear more significantly as a sense of visual incongruity than in other regions. Thus, when image data with a background density of a halftone region is printed, the difference in fog or image density between the first face and the second face of the printing medium after duplex printing appears particularly significantly as a sense of visual incongruity.

Thus, the above-described image forming method is preferably used in a case where the image data has a background density of a halftone region. Accordingly, even in a case where duplex printing is performed using image data that has a background density of a halftone region, in which the difference in fog or image density between the first face and the second face of the printing medium after duplex printing is large and thus a sense of visual incongruity is likely to appear particularly significantly, a difference in fog or image density between two facing pages of a booklet formed after the duplex printing can be reduced, and thus a sense of visual incongruity can be made smaller.

As another embodiment of the invention, it is also possible to provide an image processing program for causing a computer to execute the above-described image forming method, and a computer-readable storage medium storing the image processing program.

Examples of the storage medium may include a memory for allowing a CPU to perform processing, such as a RAM or a ROM (read only memory) itself, and a storage medium that can be read by being inserted into a program reading apparatus provided as an external storage apparatus of a computer. In either case, the stored image processing program may be executed by the CPU accessing the storage medium, or the CPU reading the image processing program from the storage medium and downloading the read image processing program in a program storage area. Herein, it is assumed that the program for downloading is stored in advance in a predetermined storage apparatus. The CPU performs overall control of the sections of the computer such that predetermined image formation is performed according to the installed image processing program.

Further, the storage medium readable with the program reading apparatus may be a medium that stores the program in a fixed manner, and examples thereof include tapes such as a magnetic tape and a cassette tape, discs including magnetic discs such as a flexible disc and a hard disc and optical discs such as a CD-ROM (compact disc-read only memory), an MO (magneto optical disc), an MD (mini disc), and a DVD (digital versatile disc), cards such as an IC (integrated circuit) card (including memory cards) and an optical card, and semiconductor memories such as a mask ROM, an EPROM (erasable programmable read only memory), an EEPROM (electrically erasable programmable read only memory), and a flash ROM.

Furthermore, the computer may be connectable to a communication network including the Internet, and the storage medium may be a medium that flexibly carries a program by downloading the image processing program from the communication network. It should be noted that in a case where the image processing program is downloaded from the communication network, the program for downloading may be stored in advance in the computer or installed from another storage medium.

Furthermore, a computer system that executes the image processing program read from the storage medium is, for example, a system connecting an image reading apparatus such as a flatbed scanner, a film scanner, or a digital camera, a computer that performs various types of processing including the above-described image forming method by executing various programs, an image display apparatus such as a CRT (cathode ray tube) display or a liquid crystal display that displays a result of processing performed by the computer, and an image output apparatus such as a printer that outputs a result of processing performed by the computer to paper or the like. Also, the computer system is provided with a modem or the like for sending and receiving various programs including the image processing program and various types of data such as image data, through connection to a server or the like via the communication network.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus that performs duplex printing in which image data is printed on both of a first face of a printing medium and a second face which is an opposite face of the first face, comprising:

an input section that can input a series of pieces of image data having an order of printing that is determined in advance;

a determination section that determines a difference in transfer efficiency between a first face and a second face of a printing medium after duplex printing;

a judgment section that judges whether or not to change the order of printing based on the difference in transfer efficiency determined by the determination section;

a control unit that controls the order of printing of image data based on the judgment; and an output section that prints image data on a printing medium, wherein in a case where the judgment section judges to change the order of printing, the output section prints image data on a printing medium in an order of printing that has been changed under control of the control unit.

2. The image forming apparatus of claim 1, wherein, in the case where the judgement section judges to change the order of printing, the order of printing of the image data on each even-numbered printing medium is reversed from the order of printing that is determined in advance.

3. The image forming apparatus of claim 1, wherein, in the case where the judgement section judges to change the order of printing, the order of printing of the image data on each odd-numbered printing medium is reversed from the order of printing that is determined in advance.

4. The image forming apparatus of claim 1, wherein in a case where the difference in transfer efficiency determined by the determination section is larger than a predetermined threshold value, the judgment section judges to change the order of printing.

5. The image forming apparatus of claim 1, wherein the determination section includes:

a reading section that reads information for obtaining a background density of image data;

a first storage section that stores the information read by the reading section;

a second storage section that stores, in advance, a relationship between the background density of image data and the difference in transfer efficiency; and a calculation section that calculates the difference in transfer efficiency corresponding to the background density of image data obtained from the information stored in the first storage section, based on the relationship between the background density of image data and the difference in transfer efficiency stored in the second storage section.

6. The image forming apparatus of claim 5, wherein the second storage section stores a plurality of relationships between the background density of image data and the difference in transfer efficiency, according to the types of printing media.

7. The image forming apparatus of claim 4, wherein the threshold value is set to at least a minimum value at which the difference in printing density is recognized as a sense of visual incongruity.

8. The image forming apparatus of claim 1, wherein the output section includes a printing medium reversing section that reverses a first face and a second face of a printing medium after duplex printing.

9. An image forming method that performs duplex printing in which image data is printed on both of a first face of a printing medium and a second face which is an opposite face of the first face, comprising:

inputting a series of pieces of image data having an order of printing that is determined in advance;

determining a difference in transfer efficiency between a first face and a second face of a printing medium after duplex printing;

judging whether or not to change the order of printing based on the determined difference in transfer efficiency;

controlling an order of printing of image data based on the judgment; and printing image data on a printing medium.

10. The image forming method of claim 9, wherein, in the case where the order of printing is judged to be changed, the order of printing of the image data on each even-numbered printing medium is reversed from the order of printing that is determined in advance.

11. The image forming method of claim 9, wherein, in the case where the order of printing is judged to be changed, the order of printing of the image data on each odd-numbered printing medium is reversed from the order of printing that is determined in advance.

12. The image forming method of claim 9, wherein the image data has a background density of a halftone region.

13. A non-transitory computer-readable storage medium that stores an image processing program for causing a computer to execute the image forming method of claim 9.

* * * * *